(12) United States Patent
Jezequel et al.

(10) Patent No.: US 8,801,851 B2
(45) Date of Patent: Aug. 12, 2014

(54) FOAMED CONCRETE

(75) Inventors: Pierre-Henri Jezequel, Lyons (FR); Benoit Mathonier, Lyons (FR)

(73) Assignee: Lafarge, Paris (FR)

( * ) Notice: Subject to any disclaimer, the term of this patent is extended or adjusted under 35 U.S.C. 154(b) by 45 days.

(21) Appl. No.: 13/579,301

(22) PCT Filed: Feb. 16, 2011

(86) PCT No.: PCT/EP2011/052311
§ 371 (c)(1),
(2), (4) Date: Aug. 16, 2012

(87) PCT Pub. No.: WO2011/101386
PCT Pub. Date: Aug. 25, 2011

(65) Prior Publication Data
US 2012/0312193 A1     Dec. 13, 2012

(30) Foreign Application Priority Data

Feb. 18, 2010  (FR) .................................. 10 51157
Jul. 23, 2010  (FR) .................................. 10 56077

(51) Int. Cl.
*C04B 7/02*     (2006.01)

(52) U.S. Cl.
USPC ........... 106/713; 106/672; 106/682; 106/724; 106/737; 106/819; 264/333

(58) Field of Classification Search
USPC ................... 106/713, 724, 737, 819, 672, 682
See application file for complete search history.

(56) References Cited

U.S. PATENT DOCUMENTS

| | | | |
|---|---|---|---|
| 4,838,941 A | 6/1989 | Hill | |
| 5,298,070 A | 3/1994 | Cowan | |
| 2004/0121917 A1 | 6/2004 | Pakulski | |
| 2006/0016601 A1 | 1/2006 | Chatterji et al. | |
| 2009/0011207 A1 | 1/2009 | Dubey | |
| 2009/0200029 A1 | 8/2009 | Roddy et al. | |

FOREIGN PATENT DOCUMENTS

JP        2004-75846      3/2004
WO   WO 2005/080294 A1   9/2005

OTHER PUBLICATIONS

International Preliminary Report on Patentability for PCT/EP2011/052311.
International Search Report for PCT/EP2011/052311.

*Primary Examiner* — Paul Marcantoni
(74) *Attorney, Agent, or Firm* — Pillsbury Winthrop Shaw Pittman LLP

(57) ABSTRACT

A foamed concrete having a density from 100 to 800 kg/m$^3$ including by mass relative to the total mass of the concrete: a cement; water; from 0.01 to 5% of a water-reducing agent, plasticizer or superplasticizer; from 0.45 to 5% of a foaming agent relative to the amount of water; from 0.01 to 5% of a water-soluble calcium salt; inorganic particles from 0.1 to 300 μm in size; the ratio of foaming agent to calcium salt being from 0.3 to 0.8; excluding foamed concretes including 10% or more by mass of slag.

16 Claims, 1 Drawing Sheet

FOAMED CONCRETE

CROSS-REFERENCE TO RELATED APPLICATIONS

This is the U.S. National Stage of PCT/EP2011/052311, filed Feb. 16, 2011, which in turn claims priority to French Patent Application No. 1051157, filed Feb. 18, 2010 and French Patent Application No. 1056077, filed Jul. 23, 2010, the entire contents of both applications are incorporated herein by reference in their entireties.

The present invention relates to a foamed concrete and to foamed compositions used to prepare it.

Many types of construction materials exist that are intended for carcassing works in the form of masonry blocks. Such materials include clay-based material (for example hollow or alveolar bricks such as Monomur™), cement materials (for example solid concrete blocks or hollow concrete blocks) or organic materials (for example hemp such as Chanvribloc™)

Of these blocks, lightweight concrete blocks are advantageous for many applications by virtue of, for example, their thermal insulation properties. Lightweight concrete is a concrete which is lighter than conventional concrete due, for example, to the pores or empty spaces it contains. Such pores or empty spaces are due to the presence of air in the concrete, which forms bubbles. It is possible to produce from 1 $m^3$ of raw material, approximately 5 $m^3$ of a finished concrete product, which is a block composed of 20% of solid materials and 80% of air (for a block having a density of 400 kg/$m^3$).

One difficulty in the production of lightweight concrete blocks is to secure both lightness and mechanical strength in the block. The most widespread means of producing lightweight cement materials to make foamed blocks are:

a) to generate a gas by chemical reaction between an aluminium powder and a reactant rich in lime, in a mixture comprising sand and cement during the setting of the concrete;

b) to produce an aqueous foam (by introducing air into a mixture of water and foaming agent) and to inject the foam into a cement paste; or c) to aerate a cement paste directly in a mixer.

However, such processes are not always satisfactory. The first process, due to its complexity, does not provide sufficient control of the density. The second requires the addition to the cement paste of water as part of the foam, which naturally fluidizes the paste, but to the detriment of the final mechanical properties. The third process does not provide a sufficiently robust foam. In the last two cases, the required low fluidity is obtained by known means, which involves the use of fluidizing and/or water-reducing agents, and sometimes by optimization of the granulometry of the mix of powders. Although the use of fluidizing agents (such as superplasticizers) does result in improved fluidity, this is generally associated with a high segregation of the particles, as well as an increased tendency to generate lumps, which prejudices the mechanical strength of the solid material produced.

The problem which the invention seeks to solve is to simplify the production of foamed concrete; to facilitate the production of fluid cement pastes having low water/cement and water/solid ratios; and/or to secure good thermal and mechanical properties for the foamed concrete.

Unexpectedly, the inventors have discovered that the joint use, in specific ratios, of a specific known accelerator, and a foaming agent produces a synergistic effect, increasing the fluidity of a cement paste. The increase in fluidity facilitates pumping of the paste and also facilitates foaming, for example in high shear rate mixers.

The invention seeks to provide at least one of the following:
foamed concrete which can be used, for example as pre-cast blocks, in the building or construction industries (including civil engineering, and roads) and which can be pre-cast in plants (for example ready-mix concrete mixing plants) or on job sites;

foamed concrete of low density; foamed concrete having good thermal, acoustic and/or mechanical properties;

cement slurries for preparing foamed concrete, the slurries having a low water content compared to the same slurry without the admixtures used in the invention;

foamed concrete blocks which make it possible to substantially reduce thermal bridging at, for example, slab edges, cross walls, wall ties and lintels (it may be possible to reduce indoor or outdoor insulation);

foamed concrete blocks produced by moulding and setting at ambient temperature, followed by hardening, for example under ambient conditions (for example without heating), thereby reducing the energy necessary for their production and the associated emissions of $CO_2$; and/or foamed concrete with improved resistance to cracking when compared with known blocks of similar density.

The present invention accordingly provides a foamed concrete having a density from 200 to 800 kg/$m^3$ comprising by mass relative to the total mass of the concrete
a cement;
water;
from 0.01 to 5% of a water-reducing agent, plasticizer or superplasticizer;
from 0.45 to 5% of a foaming agent relative to the amount of water;
a water-soluble calcium salt;
comprising inorganic, e.g. mineral, particles from 0.1 to 300 μm in size (preferably selected from calcium carbonate, silica fume, slag, fly ash, pozzolan, glass and siliceous fillers and mixtures thereof), the ratio of foaming agent to calcium salt being from 0.3 to 0.8; with the exclusion of foamed concrete comprising 10% or more by mass of slag.

In this specification including the accompanying claims the ratio of 0.3 to 0.8 is calculated on the basis of anhydrous calcium chloride as the calcium salt. When a different calcium salt is used the mass of calcium salt used to calculate the ratio is the mass expressed in terms of the equivalent mass of anhydrous calcium chloride.

It is possible to recycle existing foamed concrete of the invention for reuse in the production of new foamed concrete. The existing foamed concrete is crushed using low energy crushing means to produce a particulate material generally having a particle size from 200 to 1000 μm. Up to about 10% by mass of the particulate material can be incorporated into new foamed concrete, relative to the mass of the new foamed concrete.

When the water-reducing agent, plasticizer, superplasticizer or foaming agent is used in solution, the amount is the amount of active ingredient in the solution.

The calcium salt may be a hydrate or anhydrous: when a hydrate is used the amount is expressed in terms of the anhydrous material.

The foaming agent is preferably an anionic foaming agent, for example a sulfonate or sulfate, and is more preferably selected from an alkyl sulfonate, an alkyl ether sulfonate, a hydroxyalkyl ether sulfonate, an alpha olefin sulfonate, an alkyl benzenesulfonate, an alkyl sulphate, an alkyl ether sulphate, a hydroxyalkyl ether sulphate, an alpha olefin sulphate and an alkyl benzenesulphate, or a mixture thereof.

The alkyl sulphate or alkyl ether sulphate preferably has the formula:

$$C_nH_{2n+1}-(OCH_2CH_2)_m-OSO_3M \quad (I)$$

in which n is from 8 to 14, the grouping $C_nH_{2n+1}$ is linear or branched, m is from 0 to 15, and M represents an alkali metal. M preferably represents sodium or potassium, more preferably sodium; m is preferably from 0 to 10, for example 0 to 9.

The preferred foaming agent is a linear or branched alkyl ether sulphate of formula (I) in which n is from 8 to 12, preferably from 10 to 12, for example 9 to 11, and m is from 1 to 6.

The grouping $C_nH_{2n+1}$ is preferably linear.

The foaming agent may be a mixture of alkyl ether sulphate and alkyl sulphate. Each alkyl ether sulphate and alkyl sulphate may itself be a mixture of compounds according to formula (I).

The term "water-soluble calcium salt" in this specification including the accompanying claims is to be understood as a salt having a solubility in water at 20° C. greater than 2 g/100 ml. Such salts generally have an anion which is acceptable for use in cement-containing aqueous compositions at the concentrations used in the invention. The water-soluble calcium salt is preferably calcium chloride, calcium nitrite, calcium nitrate, calcium formate, calcium acetate or a mixture thereof. Calcium chloride, calcium formate and calcium nitrate are preferred.

The water-soluble calcium salt used in the invention may be in a solid, e.g. powder, or liquid, e.g. aqueous solution, form.

The ratio of foaming agent to water-soluble calcium salt is preferably from 0.4 to 0.8, for example 0.45 to 0.75, preferably from 0.45 to 0.65, more preferably from 0.45 to 0.6, most preferably from 0.45 to 0.55.

The foamed concrete according to the invention preferably has a density from 300 to 700 kg/m³, more preferably from 400 to 600 kg/m³, most preferably from 450 to 550 kg/m³.

The foamed concrete of the invention generally comprises from 30 to 90% by volume of a gas, e.g. air, more preferably from 60 to 80% by volume. The air may be in the form of micro-cells and give the block an alveolar structure providing thermal insulating properties ("distributed insulation"). The micro-cells may be, for example, 0.5 to 1 mm in size. The air is generally trapped homogeneously in the mass of the material and assumes an insulating role.

Cements suitable for use in the present invention include Portland cement, calcium aluminate cement, magnesium based cement, calcium sulfo-aluminate cement, and mixtures thereof.

The preferred Portland cements are those defined in the EN 197-1 Standard, more preferably cements comprising calcium carbonate, silica fume, slag, fly ash, pozzolan, glass or siliceous filler or mixtures thereof. Such cements include Portland cement (CEM I); Portland slag cement; Portland-silica fume cement; Portland-pozzolana cement; Portland-fly ash cement; Portland-limestone cement; and Portland-composite cement preferably comprising calcium carbonate, silica fume, slag, fly ash, pozzolan, glass or siliceous filler or mixtures thereof; pozzolanic cement; and composite cement. It will be understood that the mineral particles present in the foamed concrete of the invention may already be present in the cement if a blended cement is used.

The preferred calcium aluminate cements are, for example, the Ciments Fondus®, the aluminate cements, and cements according to the NF EN 14647 Standard.

The preferred magnesium based cements may include magnesium carbonates, magnesium oxide or magnesium silicates, for example as disclosed in U.S. Pat. No. 4,838,941.

The preferred cement for use in the invention is a Portland cement, either alone or in combination with any one of the other aforementioned cements, for example a calcium sulfoaluminate cement. The ratio of cement (expressed as ground clinker) to the inorganic particles in the foamed concrete of the invention is preferably from 30/70 to 50/50, more preferably 35/65 to 50/50, most preferably about 35/65.

The water/cement (W/C) ratio (in which cement is expressed as ground clinker) in the foamed concrete of the invention is preferably from 0.3 to 0.9, more preferably 0.4 to 0.7, most preferably about 0.45.

The amount of water reducing agent, plasticizer or superplasticizer is preferably 0.01 to 0.2%, more preferably 0.02 to 0.08%.

The water/cement weight ratio of the foamed concrete according to the invention may vary depending, inter alia, on water demand of the mineral particles used. The water/cement ratio is defined as the weight ratio of the amount of water (W) to the weight of the cement (C). In the Concrete Admixtures Handbook, Properties Science and Technology, V. S. Ramachandran, Noyes Publications, 1984:

A water reducer is defined as an additive which reduces the amount of mixing water of concrete for a given workability by typically 10-15%. Water reducers include, for example lignosulphonates, hydroxycarboxylic acids, carbohydrates, and other specialized organic compounds, for example glycerol, polyvinyl alcohol, sodium alumino-methyl-siliconate, sulfanilic acid and casein.

Superplasticizers belong to a new class of water reducers chemically different from the normal water reducers and capable of reducing water contents by about 30%. The superplasticizers have been broadly classified into four groups: sulphonated naphthalene formaldehyde condensate (SNF) (generally a sodium salt); or sulphonated melamine formaldehyde condensate (SMF); modified lignosulfonates (MLS); and others. More recent superplasticizers include polycarboxylic compounds such as polyacrylates. The superplasticizer is preferably a new generation superplasticizer, for example a copolymer containing polyethylene glycol as graft chain and carboxylic functions in the main chain such as a polycarboxylic ether. Sodium polycarboxylate-polysulphonates and sodium polyacrylates may also be used.

Preferably, the foamed concrete according to the present invention comprises a superplasticizer, for example a PCP superplasticizer. The term "PCP" or "polycarboxylate polyoxide" is to be understood according to the present invention as a polymer or copolymer of acrylic and/or methacrylic acids, and of their esters of poly(ethylene oxide) (PEO).

The foamed concrete of the invention preferably does not comprise an antifoaming agent. Some commercial superplasticizers may contain antifoaming agents and may be unsuitable for use in the invention.

The inorganic particles in the foamed concrete of the invention are preferably calcium carbonate, silica fume, slag, fly ash, pozzolan, preferably a naturally-occurring pozzolan, glass, e.g. as crushed glass or beads, and siliceous fillers, or mixtures thereof.

The inorganic particles vary in their thermal conductivity. In general slag has a lower thermal conductivity than fly ash which has a lower thermal conductivity than naturally-occurring pozzolan which has a lower thermal conductivity than limestone.

The inorganic particles are preferably from 1 to 100 μm, for example from 1 to 80 μm in size. The $D_{10}$ of the particles is preferably from 1 to 4 μm. The $D_{50}$ of the particles is preferably from 4 to 20 μm, more preferably from 6 to 15 μm. The $D_{90}$ of the particles is preferably from 12 to 100 μm.

Preferably, the concrete of the invention further comprises hydrated, hemi hydrated or anhydrous calcium sulphate.

Preferably, the foamed concrete of the invention further comprises lime.

The foamed concrete of the invention preferably further comprises a foam-stabilizing agent, for example a betaine, an amine oxide or a fatty amide.

Other additives may also be used, for example a retarder, e.g. citric acid.

The invention also provides a process for the production of a foamed concrete according to the invention which process comprises:

(a) mixing:
- a cement;
- water;
- from 0.01 to 5% of a water-reducing agent, plasticizer or superplasticizer;
- from 0.45 to 5% of a foaming agent relative to the amount of water;
- a water-soluble calcium salt;
- inorganic, e.g. mineral, particles from 0.1 to 300 μm in size (preferably selected from calcium carbonate, silica fume, slag, fly ash, pozzolans, glass and siliceous fillers and mixtures thereof), the ratio of foaming agent to calcium salt being from 0.3 to 0.8;

(b) introducing a gas, preferably air, into the mixture obtained in step (a) to form a foamed concrete; and optionally (c) moulding the foamed concrete and letting it set.

A foamed concrete element (i.e. a foamed concrete in shaped form), for example a block, may thus be obtained.

The foamed concrete will continue to harden with time after setting. The hardening process need not be fully complete before demoulding. It will be understood that the element can be demoulded when it has sufficient mechanical strength to retain its shaped form.

In a preferred embodiment of the invention all of the air introduced in step (b) remains in the foamed concrete.

The moulded element may be a preform which, after moulding, is cut to produce an element of the desired shape, e.g. a block. The element is preferably kept in such a way as to prevent or reduce early loss of water: for example the element may be covered by a water-impermeable, e.g. plastics sheet; or the element may be allowed to harden in a humid atmosphere, preferably at a controlled relative humidity, more preferably greater than 80%, generally for at least 24 hours.

The mixing step in the process of the invention preferably comprises an initial mixing and, preferably, deflocculation step; preferably the mixture obtained from the initial mixing and deflocculation is subjected to a further mixing at a high shear rate.

The process according to the present invention preferably does not comprise an autoclaving step.

The period of time before setting in step (c) of the process of the invention is preferably from 1 to 7 hours, for example about 2 hours.

The mixing step (a) generally produces a cement slurry.

Generally step (a) is carried out according to one of the following methods:
- the components are added at the same time as the water and/or in the water; or
- the solid components are mixed in a dry form before adding the water.

Preferably the ingredients (except for the foaming agent) and part of the water are mixed first; at this stage the ingredients are uniformly mixed and deflocculation occurs. The foaming agent and the remainder of the water are then added and further mixing is effected. Addition of the foaming agent and the remainder of the water increases the fluidity of the mixture and facilitates the further mixing, for example at a high shear rate.

The step (b) of introducing a gas may be carried out in different ways, for example by direct introduction of the gas or by the introduction of a dispersion of a gas phase in a liquid (a foam), generally an aqueous liquid. A foaming agent is required to produce the foam. The foaming agent used is preferably anionic or non-ionic; it may be the same as or different to the foaming agent used in step (a) to prepare the foamed concrete according to the invention.

According to a feature of the process of the invention, the gas may be introduced directly into a liquid mixture of the ingredients of the concrete of the invention, for example before or during mixing at a high shear rate. In particular the process of direct injection of air described in patent application WO2005/080294 is particularly suitable.

The gas, is introduced under pressure into the mixture obtained in step (a): the pressure is preferably from 1 to 5 bars gauge. The gas is preferably introduced after the initial mixing at a low shear rate and before or during the mixing at a high shear rate.

According to a further feature of the invention, the introduction of the gas may be carried out by the introduction of a dispersion of the gas in a liquid, in particular by introduction of a gas foam in water. The air dispersion in water may be directly introduced into the composition according to the present invention then mixed in a static mixer, in batches or continuously.

The density of the foamed concrete according to the invention may be adjusted by, for example, adjusting the amount of air introduced at the foaming step and/or adjusting the speed of the mixer used to produce the foam.

In this feature of the invention the mixture of the step (a) is preferably made at a concrete mixing plant. The mixture is then placed in a mixer truck (for example a drum truck) then a foam is added either directly in the truck or directly on the jobsite when the truck arrives. The foamed slurry is then poured into a mould.

The invention also provides a shaped element, for example a building block comprising the foamed concrete according to the invention; the use of such a block in the construction field; the use of such a block in the production of pre-fabricated items for the construction field; and a pre-fabricated item for use in the construction field comprising a block according to the invention.

The foamed concrete according to the invention can be used to produce blocks that are intended for carcassing work and also for light-weight construction works. The blocks may be in various forms, for example in the form of bricks, such as alveolar bricks, of various sizes and thicknesses. The blocks have the advantage of being easy to handle, and in particular of generally being able to be cut with a manual saw. It is also generally possible to sand the surface of a block for example, using a sanding board if there is an undesired protrusion.

The foamed concrete according to the invention can also be used to produce cast-in-place concrete element including cement-based panels.

The foamed concrete blocks according to the present invention are generally in the form of a rectangular parallelepiped; they are normally grey in colour. Other colours are possible by incorporating colouring agents into the mixture used to prepare the foamed concrete and/or by using a lighter-coloured cement having, for example, a low iron content. A range comprising blocks, lintels, floor and roof slabs, and panels for partition walls makes it possible to build a substantially complete house of lightweight concrete according to the invention. The density of the block can be adapted according to its function. The laying of the material can be rapid and 3 m²/hour may be produced for a solid wall by assembly using a mortar glue (the "thin joint" laying method which reduces thermal bridging). It is also possible to assemble the blocks using a known mortar following a conventional laying procedure.

The foamed concrete according to the present invention generally has good thermal properties, and in particular low thermal conductivity. The thermal conductivity, lambda ($\lambda$) of a material represents the quantity of heat transferred per unit of surface, per unit of time per unit of temperature gradient. In the international system of units, thermal conductivity is expressed in watts per meter Kelvin, (W/m·K). Conventional concretes have a thermal conductivity at 23° C. and 50% relative humidity of between 1.3 and 2.1. Typical known lightweight structural concretes have thermal conductivities generally higher than 0.8 W/m·K at 23° C. and 50% relative humidity. The foamed concrete according to the present invention generally has a thermal conductivity from 0.05 to 0.6 W/m·K, preferably from 0.05 to 0.4 W/m·K, more preferably from 0.05 to 0.25 W/m·K, most preferably from 0.1 to 0.2 W/m·K.

The foamed concrete block according to the present invention generally has good acoustic properties, and in particular low phonic conductivity.

The foamed concrete according to the invention generally has good mechanical properties, and in particular good compressive strength. The compressive strength is generally from 1 to 10 MPa, preferably from 2 to 8 MPa, more preferably from 2 to 4 MPa, most preferably about 3 MPa.

The invention also provides a product comprising a foaming agent and a water-soluble calcium salt in a mass ratio of 0.3 to 0.8 for simultaneous, separate or sequential use for reducing the viscosity of an aqueous medium, for example a foamed concrete composition such as one according to the present invention; the product may be a composition (preferably aqueous) comprising the foaming agent and water-soluble calcium salt in a mass ratio of 0.3 to 0.8.

BRIEF DESCRIPTION OF THE FIGURES

The accompanying Figures illustrate the invention without restricting its scope.

Referring to FIG. 2, the process of the invention comprises the preparation of a batch-made slurry (1) comprising cement, inorganic particles (additions), admixtures, water, accelerator (the calcium salt), and a foaming agent. The process comprises continuous foaming (2) with introduction of air in the dynamic Mondomix mixer, and finally the pouring/forming of the lightweight concrete (3).

Figure 1:
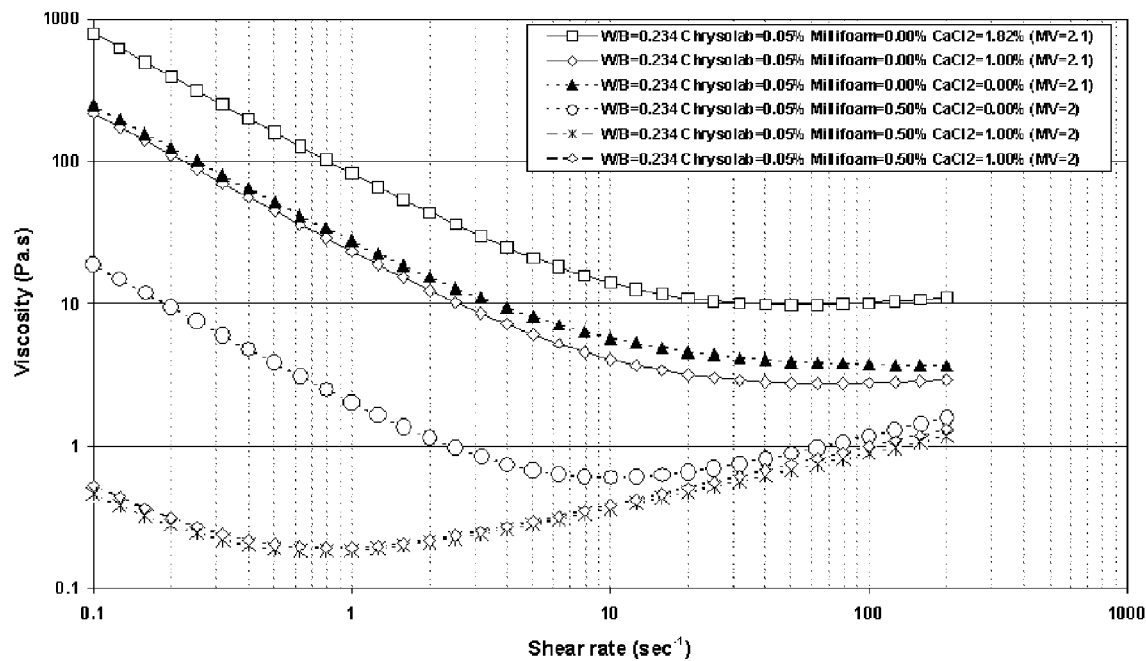
FIG. 1 represents the relationship between the viscosity and the shear rate for different pastes in which different specific admixtures were added. The reduction in viscosity values in compositions according to the invention may be demonstrated by measuring viscosity values in known manner. Viscosity values may be measured at 23° C. in a cylindrical Couette rheometer (Haake RS600), equipped to limit sliding at the edges (as is common practice in rheometry). A steady state rotation of the mobile part at a shear rate of typically 400 sec$^{-1}$ is achieved for 2 minutes. Then shear rate is allowed to ramp logarithmically ascending from 0 to 200 sec$^{-1}$ in 70 sec, kept steady for 10 sec and allowed to ramp logarithmically descending from 200 to 0 sec$^{-1}$ in 70 sec. Viscosity data are measured in the descent.
Figure 2:
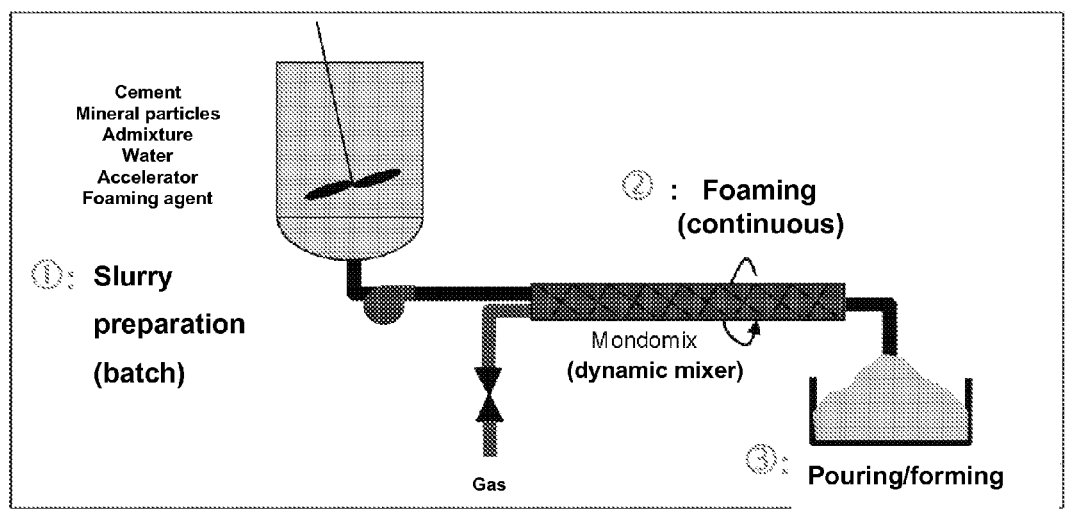
FIG. 2 is a diagram of a process for the production of a foamed concrete element according to the present invention with direct introduction of air.

It is to be understood that, unless otherwise specified, in this specification including the accompanying claims:

1. Percentages are by mass.
2. Compressive strengths are as measured on 10 cm by 10 cm by 10 cm (1 liter) blocks 28 days after their production. During the 28 days the blocks were covered with a plastics sheet. The blocks were maintained in a drying oven at 45° C. and 10% relative humidity for 24 hours before the test. They were then crushed in a Zwick™ (PRES-018) press raising the pressure at a rate of 1000 Newtons/second until the block broke.
3. Thermal conductivities are as measured on 10 cm by 10 cm by 10 cm (1 liter) blocks 28 days after their production. During the 28 days the blocks were covered with a plastics sheet. The blocks were maintained in a drying oven at 85° C. for 48 hours before the test. Thermal conductivity is measured using a thermal conductivity measuring device (CT meter). A 1 liter block is cut in half. A calibrated measurement cell is placed and fastened between two flat sides of the cut block. The heat is transmitted from the source towards the thermocouple by the material surrounding the cell. The rise of temperature at the thermocouple level as well as the energy transmitted by the source of heat, measured as a function of time, allows calculation of the thermal conductivity of the block material surrounding the measurement cell.
4. Particle size and size distribution (between 0.02 µm and 2 mm) are as measured using a Malvern MS2000 laser granulometer. Measurement is effected in ethanol. The light source consists of a red He—Ne laser (632 nm) and a blue diode (466 nm). The optical model is that of Mie and the calculation matrix is of the polydisperse type.

The apparatus is checked before each working session by means of a standard sample (Sibelco France (formerly known as Sifraco) C10 silica) for which the particle size distribution is known.

Measurements are performed with the following parameters: pump speed 2300 rpm and stirrer speed 800 rpm. The sample is introduced in order to establish an obscuration between 10 and 20%. Measurement is effected after stabilisation of the obscuration. Ultrasound at 80% is first applied for 1 minute to ensure the de-agglomeration of the sample. After about 30 s (for possible air bubbles to clear), a measurement is carried out for 15 s (15000 analysed images). Without emptying the cell, measurement is repeated at least twice to verify the stability of the result and elimination of possible bubbles.

All values given in the description and the specified ranges correspond to average values obtained with ultrasound.

The expression "hydraulic composition" is to be understood according to the present invention as a mix of a hydraulic binder, with water, optionally aggregates, optionally admixtures according to the EN 934-2 Standard, and optionally additions. The expression "hydraulic composition" according to the present invention denotes a composition in the fresh, set or hardened state. More preferably, the hydraulic composition according to the present invention is a cement slurry. A hydraulic composition may for example be a concrete such as self-placing concrete, self-levelling concrete, self-compacting concrete, fibred concrete, ready-mix concrete, jobsite concrete, lightweight concrete, pre-cast concrete, or coloured concrete. The expression "ready-mix concrete" is to be understood according to the present invention as a concrete having sufficient open workability time to allow for the transport of the concrete to the jobsite where it will be cast. The term "concrete" according to the present invention denotes freshly mixed concrete, set concrete or hardened concrete.

The term "addition", is to be understood according to the present invention as the inorganic particles from 0.1 to 300 µm in size. The term "setting", is to be understood according to the present invention as the passage to the solid state of the hydraulic binder by hydration reaction. The setting is generally followed by a hardening period.

The term "hardening", is to be understood according to the present invention as the acquisition of mechanical strength of a hydraulic binder. The hardening generally takes place after the end of the setting.

The expression "elements for the construction field", is to be understood according to the present invention as any element of a construction, for example a floor, a screed, a foundation, a basement, a wall, a partition wall, a wall lining, a ceiling, a beam, a work top, a pillar, a concrete block, a block of lightweight concrete, a post, a cornice, a mould, a coating, a jointing compound, an insulating element (acoustic and/or thermal).

The term slag denotes a slag which: preferably comprises at least two thirds by mass of glassy slag; preferably has hydraulic properties when activated in known manner; preferably comprises at least two-thirds by mass of the sum of calcium oxide (CaO), magnesium oxide (MgO) and silicon dioxide ($SiO_2$), the remainder preferably comprising aluminium oxide ($Al_2O_3$); the ratio by mass $(CaO+MgO)/(SiO_2)$ is preferably greater than one.

The compositions of the invention are referred to as "foamed concrete" in view of their mechanical properties and the nomenclature generally used in this technological field. They do, however, differ from conventional concrete in that they do not contain coarse aggregate.

The following Example illustrates the invention without restricting its scope.

EXAMPLE 1

Materials:
Millifoam H: an anionic foaming agent (alkyl ether sodium sulphate) supplied by the Huntsman company. Calcium chloride: pure anhydrous $CaCl_2$ from Verre Labo Mula. The Portland cement is a CEM 152.5 R cement from the Lafarge Port La Nouvelle cement plant (Batch No. LHY-3830 or LHY-3867).
The inorganic particles are calcium carbonate supplied by the OMYA company under the brand name of Betocarb HP Entrains in which the $D_{50}$ is 7.8 µm, the $D_{10}$ is 1.7 µm, the $D_{90}$ is 93 µm and with a maximum particle size of 200 µm (Batch No. ADD-0239).
The plasticizer is a product comprising a polycarboxylate polyoxide (PCP) supplied by the Chryso company: it is based on Premia 180 but does not contain an antifoaming agent.
The fly ash comes from North America (Lafarge, Will County, Ill.): particle size $D_{50}$=6.8 µm.
Superpozz is from South Africa: particle size $D_{50}$=3.4 µm.
The pozzolan comes from Greece (Yali): particle size $D_{50}$=10.6 µm.
Water: tap water.

Cement Slurries

For each formulation the cement, the inorganic solids and the calcium salt were weighed together on a scale. The mixing water and the plasticizer (Chrysolab) were then weighed separately. The Millifoam was weighed separately. All the weighed powders were placed in a mixer (Rayneri™ MALX-104, Rayneri VMI, model PH602, serial no. 121025) and were stirred for one to two minutes using the mixer's rotating blade with a planetary motion (17 revolutions/minute). The mixing water comprising the fluidizer was added to the powders in the pan of the mixer (33 revolutions/minute for one to two minutes, depending on the volume). A cement slurry was thus obtained, which was stirred for two additional minutes in the mixer. The mixer was stopped. The pan of the mixer was scraped and the Millifoam was poured onto the surface of the cement slurry. Mixing was resumed to incorporate the Millifoam in the slurry (the speed varying from 17 to 25 revolutions/minute for approximately two minutes). Cement slurries were obtained and were ready to be foamed. Table 1 below presents the chemical compositions of the different cement slurries.

TABLE 1

| | Slurry formulations | | | | |
|---|---|---|---|---|---|
| Ingredients | 1 | 2 | 3 | 4 | 5 |
| Millifoam H [1] | 1.45 | 1.42 | 1.49 | 1.42 | 1.41 |
| $CaCl_2$ | 0.8 | 0.78 | 0.83 | 0.78 | 0.79 |
| CEM I 52.5 R Cement | 40.13 | 26.63 | 41.61 | 26.64 | 39.29 |
| $CaCO_3$ | 39.74 | 27.3 | 0 | 40.85 | 0 |
| Chrysolab | 0.16 | 0.13 | 0.16 | 0.13 | 0.16 |
| Water | 17.72 | 19.64 | 19.54 | 19.38 | 18.45 |
| Pozzolans | 0 | 0 | 0 | 10.8 | 0 |
| Superpozz | 0 | 24.1 | 36.37 | 0 | 0 |
| Fly Ash | 0 | 0 | 0 | 0 | 39.9 |
| Ratio of Millifoam/$CaCl_2$ | 0.49 | 0.49 | 0.48 | 0.49 | 0.48 |

Amounts in Table 1 are given in % by mass relative to the total mass of the formulation.
[1] The amount of Millifoam is the amount of commercial product which contains 27% of active material. The ratio of Millifoam to calcium chloride given in the Table is of active material to calcium chloride.

FIG. 1 shows the relationship between the viscosity and the shear rate for a cement slurry formulation according to Formulation 1 in Table 1 above. Six such formulations were tested as listed in the following Table (the figures given in the Table are the same as those listed in FIG. 1 itself). The sixth formulation is the same as the fifth and represents a rerun carried out by way of confirmation: it will be seen that the results are very similar. The two plots for the fifth and sixth formulations follow each other closely and demonstrate a substantial drop in viscosity.

TABLE 2

| Water/binder ratio[1] | Plasticizer[2] (%) | Foaming agent[3] (%) | Calcium chloride (%) | MV (g//cm$^3$) |
|---|---|---|---|---|
| 0.234 | 0.05% | 0 | 1.82 | 2.1 |
| 0.234 | 0.05% | 0 | 1 | 2.1 |
| 0.234 | 0.05% | 0 | 0 | 2.1 |
| 0.234 | 0.05% | 0.5 | 0 | 2 |
| 0.234 | 0.05% | 0.5 | 1 | 2 |
| 0.234 | 0.05% | 0.5 | 1 | 2 |

[1] The amount of binder is the combined amount of cement and calcium carbonate.
[2] Chrysolab
[3] Millifoam H: the percentage is that of the active ingredient itself All of the compositions contained superplasticizer (Chrysolab). Relative to the use of superplasticizer alone:
the use of a low dose of calcium chloride (1%) did not significantly reduce viscosity;
the use of a higher dose of calcium chloride (1.82%) led to an increase of viscosity;
Millifoam alone reduced the viscosity;
however the combination of Millifoam with the calcium salt produced a combined effect by which the viscosity was greatly reduced. In FIG. 1 both the ordinate and abscissa are logarithmic scales: it will be seen that the viscosity can be reduced by a factor of more than 10.

Lightweight Concrete

Lightweight concrete was prepared continuously. The cement slurry, obtained as described above, was poured into a holding vessel and stirred using a Rayneri Turbotest mixer (MEXP-101, Rayneri VMI, model Turbotest 33/300, serial no. 71815) comprising a deflocculating blade (the speed of the blade varied from 1000 revolutions/minutes to 400 revolutions/minutes depending on the volume of slurry). The slurry was pumped using a volume pump of the Moineau type (off-centre screw pump, Seepex™ MEXP-413, model BN-025-12, serial no. 243327) at an approximate flow rate of 1 liter/minute. The slurry was introduced into a foamer (Mondomix™ MALX-160, Minimondo A05, serial no. P14018-37115) to which compressed air (supplied by a Brooks air mass regulator, smart mass flow 5850S, serial no. T55329/028) was added at a flow rate of 2.75 liters/minute. The flow rate was adapted to the density of the desired foam at the outlet of the foamer, generally from 1 to 4 liters/minute. The rotation speed of the foamer was 400 revolutions/minute: the rotation speed was adapted to the density of the desired foam at the outlet of the foamer and may vary from 250 to 1500 revolutions/minute. A helicoidal static mixer (Isojet™) was present at the outlet of the foamer. The foam thus obtained was used to prepare a lightweight concrete.

Blocks of Lightweight Concrete

Block size: 10×10×10 cm (volume 1 liter):
The foams obtained as described above were poured into polystyrene moulds 10×10×10 cm in size at ambient temperature (20-23° C.). They were stored for 12 to 24 hours, the blocks being covered by a plastic film. They were then demoulded. Blocks were thus obtained.

Block size: 25×33×50 cm (volume 41.25 liters): (a commercial size block used for building).
The previously obtained foams were poured into wooden moulds 25×33×50 cm in size at ambient temperature (20-23° C.). They were left on stand-by for 12 to 24 hours, the blocks being covered by a plastic film. They were then demoulded. Blocks were thus obtained.

Mechanical Strength

The mechanical strength was tested 7 days and 28 days after making the 1 liter blocks. The blocks were maintained in a drying oven at 45° C. and 10% relative humidity for 24 hours before the test. They were then crushed by a Zwick™ (PRES-018) press raising the pressure at a rate of 1000 Newtons/second until the block broke. Table 3 below presents the maximum strengths at the breaking point for the blocks made using formulation 1.

TABLE 3

| | Maximum strength at the breaking point of the block at 7 days | Maximum strength at the breaking point of the block at 28 days |
|---|---|---|
| Formulation 1 at a density of 0.5 | 2.8 MPa (i.e. 28 000 Newtons/0.01 m$^2$) | 2.8 MPa (i.e. 28 000 Newtons/0.01 m$^2$) |
| Formulation 1 at a density of 0.43 | 1.7 MPa (i.e. 17 000 Newtons/0.01 m$^2$) | 1.7 MPa (i.e. 17 000 Newtons/0.01 m$^2$) |

Thermal Conductivity

The thermal conductivity of the blocks was measured using a thermal conductivity measuring device (CT meter). The blocks were maintained in a drying oven at 85° C. for 48 hours before the test. A 1 liter block was cut in half. A calibrated measurement cell was placed and fastened between two flat sides of the cut block. The heat was transmitted from the source towards the thermocouple by the material surrounding the cell. The rise of temperature at the thermocouple level as well as the energy transmitted by the source of heat, measured as a function of time, made it possible to calculate the thermal conductivity of the block material surrounding the measurement cell.

Table 4 below presents the thermal conductivities for the blocks made from formulation 1 at different densities.

TABLE 4

| | Thermal conductivity of the block in W · m$^{-1}$ · K$^{-1}$ |
|---|---|
| Formulation 1 at a density of 0.5 | 0.225 |
| Formulation 1 at a density of 0.44 | 0.207 |
| Formulation 1 at a density of 0.38 | 0.177 |

The invention claimed is:

1. A foamed concrete having a density from 200 to 800 kg/m$^3$ comprising:
   a cement;
   water;
   from 0.01 to 5% by mass of a water-reducing agent, plasticizer or superplasticizer relative to the total mass of the concrete;
   from 0.45 to 5% by mass of a foaming agent relative to the mass of water;
   a water-soluble calcium salt which is an accelerator and has a solubility in water at 20° C. greater than 2 g/100 ml;
   inorganic particles from 0.1 to 300 μm in size;
   a ratio of foaming agent to calcium salt being from 0.3 to 0.8 by mass; excluding foamed concrete comprising 10% or more by mass of slag particles relative to the total mass of the concrete.

2. The foamed concrete according to claim 1, wherein the inorganic particles comprise calcium carbonate, silica fume, slag, fly ash, pozzolan, glass, siliceous filler or a mixture thereof.

3. The foamed concrete according to claim 1 having a density from 300 to 700 kg/m$^3$.

4. The foamed concrete according to claim 1, wherein the foaming agent is selected from the group consisting of an alkyl sulfonate, an alkyl ether sulfonate, a hydroxyalkyl ether sulfonate, an alpha olefin sulfonate, an alkyl benzene sulfonate, an alkyl sulphate, an alkyl ether sulphate, a hydroxyalkyl ether sulphate, an alpha olefin sulphate and an alkyl benzene sulphate and mixtures thereof.

5. The foamed concrete according to claim 1, wherein the foaming agent is an alkyl sulphate or an alkyl ether sulphate of the formula

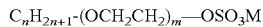

in which n is from 8 to 14, the grouping $C_nH_{2n+1}$ is linear or branched, m is from 0 to 15, and M represents an alkali metal.

6. The foamed concrete according to claim 5, wherein the foaming agent is a linear or branched alkyl ether sulphate of said formula in which n is from 10 to 12 and m is from 1 to 6.

7. The foamed concrete according to claim 1, wherein the foaming agent is a mixture of alkyl ether sulphate and alkyl sulphate.

8. The foamed concrete according to claim 1, wherein the water-soluble calcium salt is selected from the group consisting of calcium chloride, calcium formate and calcium nitrate and mixtures thereof.

9. A process for the production of a foamed concrete according to claim 1, comprising:
(a) mixing:
    a cement;
    water;
    from 0.01 to 5% by mass of a water-reducing agent, plasticizer or superplasticizer relative to the total mass of the concrete;
    from 0.45 to 5% by mass of a foaming agent relative to the mass of water;
    a water-soluble calcium salt which is an accelerator and has a solubility in water at 20° C. greater than 2 g/100 ml;
    inorganic particles from 0.1 to 300 μm in size;
    a ratio of foaming agent to calcium salt being from 0.3 to 0.8 by mass;
(b) introducing a gas into the mixture obtained in (a) to form a foamed concrete; and optionally
(c) moulding the foamed concrete and allowing the foamed concrete to set.

10. A process according to claim 9, wherein the foamed concrete produced in (b) is moulded and allowed to set to produce a preform; and the preform is cut into blocks.

11. The process according to claim 9, wherein the process does not comprise an autoclaving step.

12. The process according to claim 9, wherein the time before setting in (c) is from 1 to 7 hours.

13. The process for the production of a foamed concrete according to claim 9, wherein, after (c), the foamed concrete is allowed to harden in a controlled humid atmosphere the relative humidity of which is greater than 80%.

14. A method comprising preparing a structure with a foamed concrete according to claim 1.

15. A foamed concrete according to claim 1 in shaped form.

16. A product comprising a foaming agent and a water-soluble calcium salt having a solubility in water at 20° C. greater than 2 g/100 ml in a mass ratio of 0.3 to 0.8 for simultaneous, separate or sequential use for reducing the viscosity of an aqueous medium.

* * * * *